United States Patent
Kim et al.

(10) Patent No.: US 9,060,186 B2
(45) Date of Patent: Jun. 16, 2015

(54) AUDIENCE SELECTION TYPE AUGMENTED BROADCASTING SERVICE PROVIDING APPARATUS AND METHOD

(71) Applicant: Electronics and Telecommunications Research Institute, Daejeon (KR)

(72) Inventors: Seoung Chul Kim, Daejeon (KR); Soon Choul Kim, Daejeon (KR); Jung Hak Kim, Daejeon (KR); Bum Suk Choi, Daejeon (KR); Jeoung Lak Ha, Daejeon (KR); Young Ho Jeong, Daejeon (KR); Jin Woo Hong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 67 days.

(21) Appl. No.: 13/933,099

(22) Filed: Jul. 1, 2013

(65) Prior Publication Data
US 2014/0007173 A1  Jan. 2, 2014

(30) Foreign Application Priority Data

Jul. 2, 2012 (KR) .................. 10-2012-0071683

(51) Int. Cl.
| H04N 7/10 | (2006.01) |
| --- | --- |
| H04N 7/025 | (2006.01) |
| H04N 21/236 | (2011.01) |
| H04N 21/435 | (2011.01) |
| H04N 21/462 | (2011.01) |
| H04N 21/84 | (2011.01) |
| H04N 21/854 | (2011.01) |

(52) U.S. Cl.
CPC ........ *H04N 21/236* (2013.01); *H04N 21/23614* (2013.01); *H04N 21/435* (2013.01); *H04N 21/4622* (2013.01); *H04N 21/84* (2013.01); *H04N 21/854* (2013.01)

(58) Field of Classification Search
CPC ...................................... H04N 21/812
USPC .................. 725/32, 34, 40, 44, 114
See application file for complete search history.

(56) References Cited

U.S. PATENT DOCUMENTS

| 6,177,931 | B1 * | 1/2001 | Alexander et al. ............. 725/52 |
| 7,752,642 | B2 * | 7/2010 | Lemmons ..................... 725/32 |
| 2007/0237106 | A1 | 10/2007 | Rajan et al. |

FOREIGN PATENT DOCUMENTS

| KR | 10-2010-0121614 A | 11/2010 |
| WO | WO 2009/101997 A1 | 8/2009 |

* cited by examiner

*Primary Examiner* — Hunter B. Lonsberry

(57) ABSTRACT

An audience selection type augmented broadcasting service providing apparatus and method is provided. The audience selection type augmented broadcasting service providing apparatus may include an augmented broadcast producing server to process a production process of augmented contents to provide the augmented broadcasting service, for broadcast contents, a broadcasting server to multiplex and transmit the broadcast contents and metadata for the augmented broadcasting service, and an augmented content receiving terminal to process the augmented contents based on the metadata for the augmented broadcasting service, while playing the broadcast contents.

15 Claims, 5 Drawing Sheets

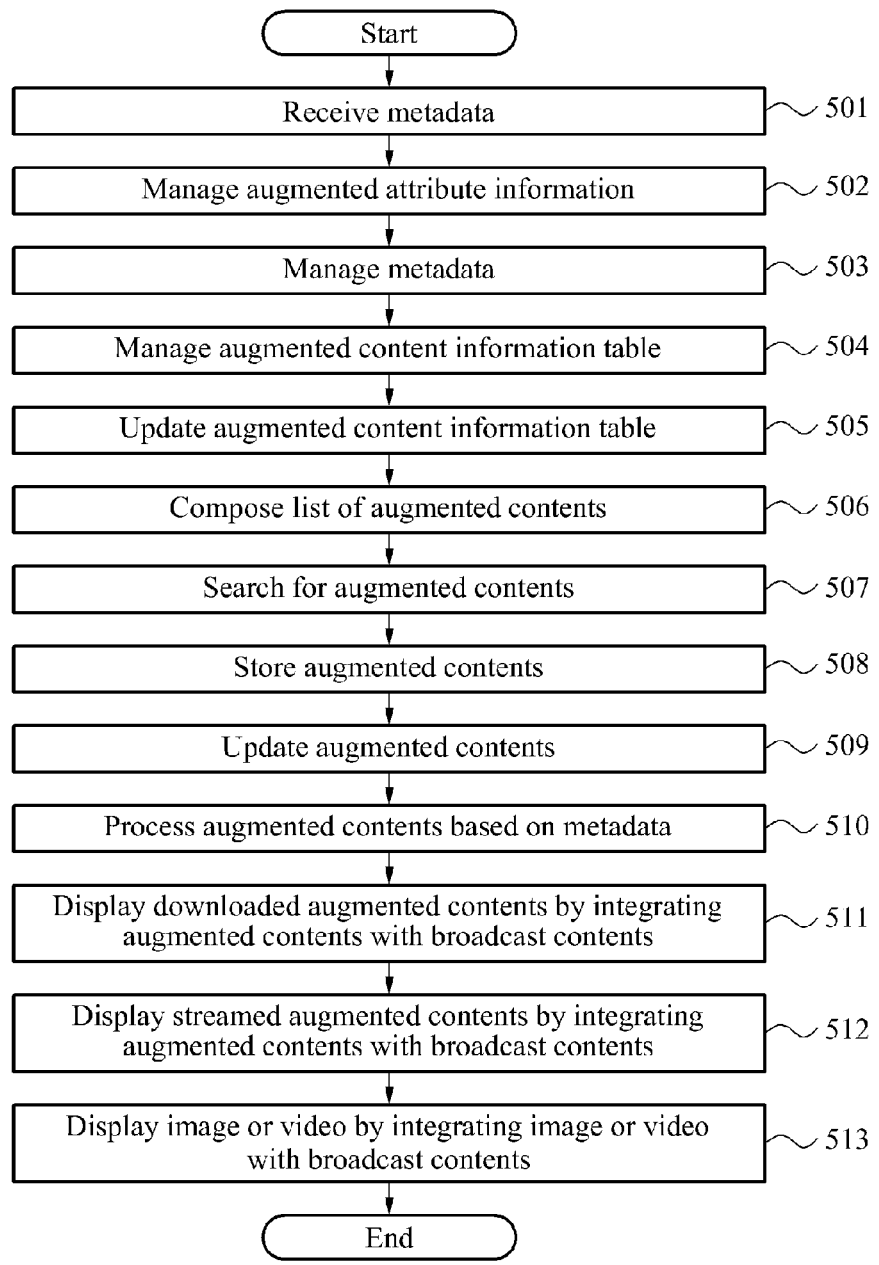

AUDIENCE SELECTION TYPE AUGMENTED BROADCASTING SERVICE PROVIDING APPARATUS AND METHOD

CROSS-REFERENCE TO RELATED APPLICATION

This application claims the benefit of Korean Patent Application No. 10-2012-0071683, filed on Jul. 2, 2012, in the Korean Intellectual Property Office, the disclosure of which is incorporated herein by reference.

BACKGROUND

1. Field of the Invention

The present invention relates to an audience selection type augmented broadcasting service providing apparatus and method that may increase a viewing pleasure by additionally displaying augmented contents, for example, images, videos, graphics, and the like, selected by an audience, in a partial area on a broadcast screen.

2. Description of the Related Art

An audience selection type augmented broadcasting service may refer to a service for transmitting a digital broadcast stream by incorporating information associated with an area or an object in a broadcast image into a conventional broadcast stream, and providing an audience with additional contents, hereinafter, referred to as augmented contents, in which broadcasting companies or third-party agents integrated with the broadcast image are displayed. Accordingly, the audience may select preferred augmented contents, and may view the selected augmented contents along with the broadcast image.

Augmented reality refers to a technology for integrating a computer graphics based virtual object or information with an actual image captured by a camera in order for the virtual object or the information to be displayed in a manner similar to an object present in an original actual environment. Ever since the augmented reality technology appeared in the early 1990s, the augmented reality technology active research and development has been conducted on applying the technology to various fields. However, due to constraints of hardware and software technologies for graphic processing, application of the augmented reality technology has been limited to fields with strong capital support, for example, aircraft manufacturing, broadcasting, and the like.

In particular, in a scheme of applying the augmented reality technology to a broadcast, as known through an example of virtual advertising, a single new image may be reconstructed and transmitted by integrating a video, an image, or a virtual graphic with an actual image captured by a camera, using a high-performance system. Reception in a television (TV) terminal may be performed in the same manner as a typical broadcast image being received, and all audiences viewing a corresponding broadcast may view an identical image.

With recent developments of computer graphics technology and hardware/software technology for a terminal, a mobile augmented reality service using a smart phone is widespread. In addition, a variety of augmented reality services has led to an increase in satisfaction of users based on distribution systems, for example, App Store, an Internet connection function and varied sensor interfaces provided by a terminal platform of a smart phone, and the like.

By applying a technology such as a platform of a smart phone to a TV or a settop for TV service, various user experiences through a combination of a broadcast, a communication, the Internet, an application, and the like may be provided, and a new application service using an intelligent platform is being developed.

SUMMARY

An aspect of the present invention provides an audience selection type augmented broadcasting service providing apparatus and method that may provide contents to be additionally integrated and displayed on a broadcast screen, along with various agents, by additionally displaying an image, a video, a graphic, and the like in a partial area of the broadcast screen in order to increase an interest in a broadcast program and a viewing pleasure, such that a plurality of audiences viewing an identical broadcast program may select additional contents corresponding to individual preference.

Another aspect of the present invention also provides an audience selection type augmented broadcasting service providing apparatus and method by which a broadcast content provider and a plurality of augmented content providers may define augmented attributes in each content and may provide the defined augmented attributes along with contents, an augmented content server may classify and manage the contents based on the augmented attributes, a terminal may suggest a range of selection by comparing augmented attribute information of broadcast contents to augmented attributes of augmented contents, integrate the selected augmented contents with a broadcast image, and display the integrated augmented contents on a screen, and an audience may select desired augmented contents among different augmented contents provided by a plurality of augmented content producers, with respect to the identical broadcast contents, and may view the selected augmented contents along with a broadcast.

Still another aspect of the present invention also provides an audience selection type augmented broadcasting service providing apparatus and method that may provide a joy of viewing and may enable a guest of a broadcast, for example, an entertainer, to self promote by displaying a character image, a photo, information related to the guest, and the like in a scene involving the guest.

Yet another aspect of the present invention also provides an audience selection type augmented broadcasting service providing apparatus and method by which an agent providing props in an image to be broadcast may display, for an audience, a scene in which additional contents containing information about a corresponding prop is integrated, in a scene involving a prop provided by the agent while a broadcast image is being played, or may display, for the audience, a scene in which the corresponding prop is integrated with information of the audience, for example, a photo, a movie, personal information, and the like, thereby producing an indirect advertising effect.

Further another aspect of the present invention also provides an audience selection type augmented broadcasting service providing apparatus and method by which an agent desiring to advertise a product through a broadcast may display information of an audience, for example, a photo, a movie, personal information, and the like, by integrating the information of the audience with an advertising image, thereby generating an increase in an advertising effect, display a scene in which a license plate number of the audience is integrated on a front or rear number plate of a car in an automobile advertizing image, or display a scene in which a family photo of the audience is integrated in a partial area of the scene at a proper point in time during image processing, thereby yielding a deep impression on the audience.

Still another aspect of the present invention also provides an audience selection type augmented broadcasting service providing apparatus and method that may display a scene in which a family photo of each audience member pre-stored in a terminal is integrated, in lieu of a painting in a frame when a drama involving a scene of the frame hung on a wall is on air, or may display a scene in which a painting of a famous artist provided by a third-party agent is integrated.

Yet another aspect of the present invention also provides an audience selection type augmented broadcasting service providing apparatus and method that may provide a foundation for various agents to access a TV screen of an audience using a broadcast program as a medium, and may be applied to broadcasting industries, for example, terrestrial broadcasting, cable broadcasting, satellite broadcasting, digital multimedia broadcasting (DMB), Internet protocol television (IPTV) broadcasting, and the like, and video services, for example, a video-on-demand (VOD) service, a user created contents (UCC) service, and the like, and Internet broadcasting.

According to an aspect of the present invention, there is provided a server providing an augmented broadcasting service, the server including an augmented broadcast producing unit to process a production process of augmented contents to provide the augmented broadcasting service, for broadcast contents, and a broadcasting unit to multiplex and transmit the broadcast contents and metadata for the augmented broadcasting service.

According to another aspect of the present invention, there is provided an augmented broadcast receiving terminal, including a receiving unit to receive broadcast contents, augmented contents, and metadata for an augmented broadcasting service from a server, and a displaying unit to process the augmented contents based on the metadata for the augmented broadcasting service while playing the broadcast contents.

According to still another aspect of the present invention, there is provided an augmented broadcasting service providing method of a server, the method including processing a production process of augmented contents to provide the augmented broadcasting service, for broadcast contents, and multiplexing and transmitting the broadcast contents and metadata for the augmented broadcasting service.

According to yet another aspect of the present invention, there is provided an augmented broadcasting service receiving method of a receiving terminal, the method including receiving broadcast contents, augmented contents, and metadata for an augmented broadcasting service from a server, and processing the augmented contents based on the metadata for the augmented broadcasting service while playing the broadcast contents.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 5 is a flowchart illustrating an augmented broadcasting service receiving method of a receiving terminal according to an embodiment of the present invention.

DETAILED DESCRIPTION

Figure 1:
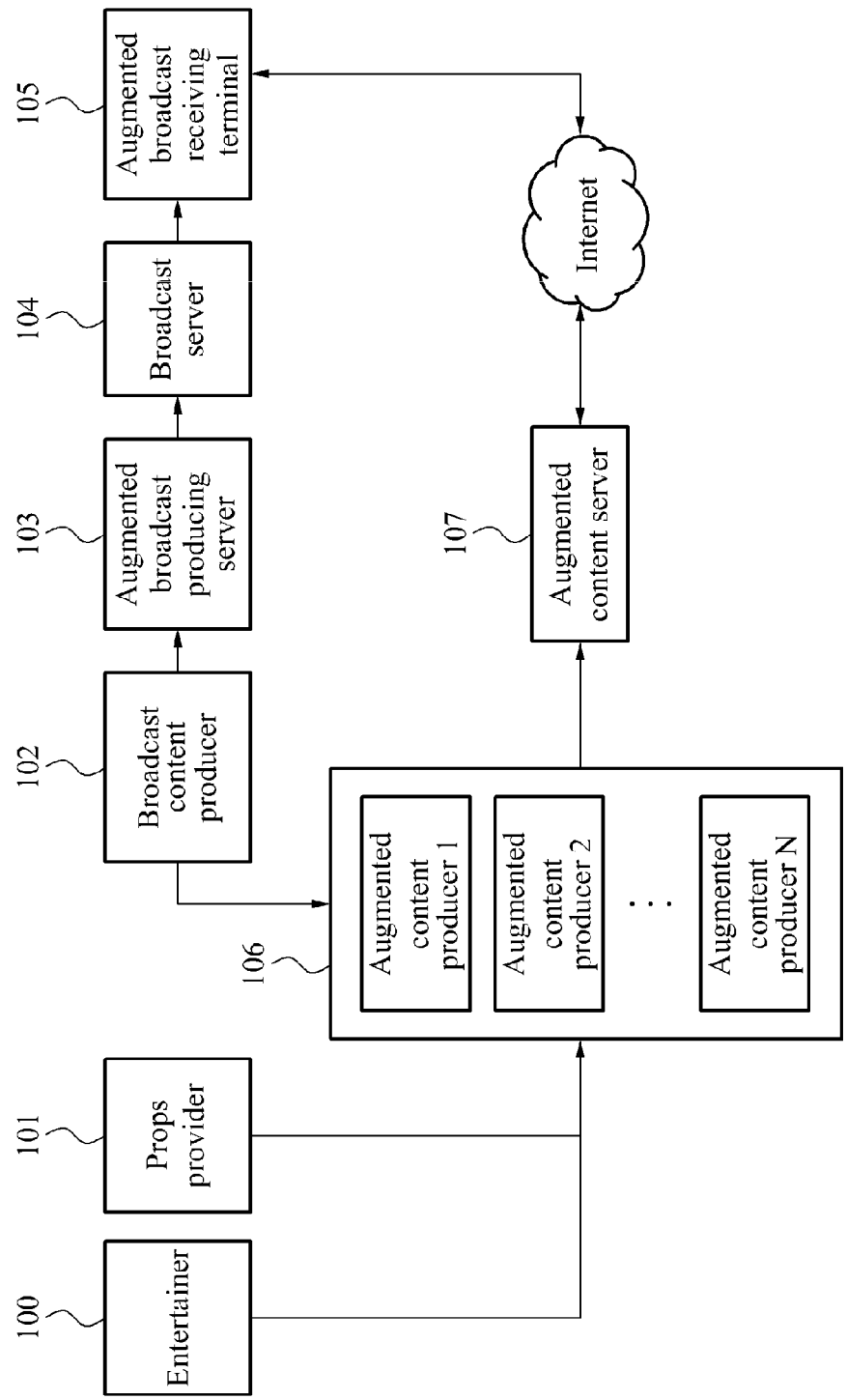
FIG. 1 is a diagram illustrating a configuration of an audience selection type augmented broadcasting service providing apparatus according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a configuration of an audience selection type augmented broadcasting service providing apparatus according to an embodiment of the present invention.

The configuration of the audience selection type augmented broadcasting service providing apparatus will be described with reference to FIG. 1.

Referring to FIG. 1, an entertainer 100 may refer to an agent desiring to provide content or a material with respect to a scenario necessary for producing augmented contents with respect to a broadcast program in which the entertainer 100 appears.

A props provider 101 may refer to an advertiser, an advertising contents producer, and the like providing a broadcast advertisement or provides a variety of props, locations, and the like for producing a broadcast program.

A broadcast content producer 102 may refer to an agent producing and providing broadcast contents, for example, a drama, a show program, a news program, and the like, based on a scenario. In general, the broadcast content producer 102 may correspond to a broadcasting company.

The broadcast content producer 102 may transfer, to augmented content producers 106, information associated with contents, for example, an intended purpose of the contents, a synopsis, and the like, information about objects to be included in an image, for example, guests, props, settings, and locations appearing in the contents.

The augmented content producers 106 may refer to agents producing and providing augmented contents. The augmented content producers 106 may produce the augmented contents by integrating the material provided by multiple agents 100 involved in producing the broadcast contents, information associated with the broadcast program provided by the broadcast content producer 102, a policy on applications of augmented effects, and the like, and may register the produced augmented contents along with augmented attribute information, in an augmented content server 107. Here, the information associated with the broadcast program may include, for example, information about guests, props, settings, locations, and the like.

The augmented attribute information may correspond to augmented contents classification criteria related to searching for and selecting augmented contents applicable to a broadcast program desired by an audience. Augmented attributes may include elements, as follows:

Attribute 1: Whether augmented contents are authorized by a broadcast content provider;
Attribute 2: Whether advertising contents are included;
Attribute 3: Augmentation with respect to object in image;
Attribute 3-1: Object code;
Attribute 4: Augmentation with respect to partial area designated irrespective of object in image;

Attribute 5: Version;
Attribute 6: Augmented content producer code;
Attribute 7: Broadcast content code; and
Attribute 8: Broadcast content provider code.

Attribute 1 may indicate a case in which augmented contents are authorized by a broadcast content provider. The augmented contents may be authorized such that selection of augmented contents may be limited by the broadcast content provider depending on characteristics of contents.

Attribute 2 may indicate whether elements associated with an advertisement are included in the augmented contents.

Attribute 3 may indicate augmented contents associated a specific object in a broadcast image, and in particular, augmented contents applicable to an augmented area designated based on an object, for example, a specific guest, an element of setting, a variety of props, and the like.

Attribute 3-1 may correspond to an information code indicating a corresponding object for a case in which Attribute 3 is defined as "Positive." All objects may be assigned unique object codes in advance, respectively.

In relation to Attribute 3-1, broadcasting service information transferred from a broadcasting company to a terminal may include object codes of objects for which augmented areas are designated, among object elements, for example, guests, props, and the like, appearing in a broadcast program. The terminal may utilize such information to search for and select augmented contents.

In relation to Attribute 3-1, an object code may identify an object having a sense of uniqueness, for example, a character, and an object without a sense of uniqueness. In a case of the object having a sense of uniqueness, an identical object code may be reflected with respect to all broadcast programs. In a case of an industrial product, a predetermined model may be indicated using a single object code.

Attribute 4 may indicate augmented contents applicable to a partial area designated irrespective of objects in an image.

Attribute 5 may indicate version information of augmented contents. The terminal may use Attribute 5 to compare and update version information with respect to augmented contents downloaded in advance, stored, and managed.

Attribute 6 may correspond to a unique code for an augmented content producer. Attribute 6 may be utilized for a case in which an augmented broadcasting service is desired to be received, using only augmented contents produced by a predetermined enterprise, with respect to a single broadcast program.

Attribute 7 may correspond to a unique code for broadcast contents. An audience may utilize Attribute 7 for readily conducting a search for augmented contents applicable to a predetermined broadcast program.

Attribute 8 may correspond to a unique code for a broadcast content provider. In general, the broadcast content provider may correspond to a broadcasting company or a channel provider. In this instance, an audience may utilize Attribute 8 for readily conducting a search for augmented contents applicable to all programs of a predetermined broadcasting company or channel provider.

An augmented broadcast producing server 103 may refer to a system that processes a production process for providing an augmented broadcasting service, for produced broadcast contents. The augmented broadcast producing server 103 may define and output augmented attribute information about corresponding contents, and may generate and output metadata for the augmented broadcasting service by analyzing an image. The attribute information may include elements, as follows:

Attribute 1: Whether augmented contents are authorized by broadcast content provider;
Attribute 2: Whether advertising contents are included;
Attribute 3: Object code;
Attribute 4: Broadcast content provider code; and
Attribute 5: Broadcast content code.

Attribute 1 may indicate that only augmented contents authorized by a broadcast content provider may be applicable, with respect to the entire section of a corresponding broadcast program. Attribute 1 may limit a selection of an audience with respect to augmented contents.

Attribute 1 may be incorporated into metadata for an augmented broadcasting service with respect to augmented areas of a program, before transmission, for only augmented contents authorized by the broadcast content provider to be applied, on a limited basis, with respect to a predetermined augmented area in the corresponding program.

Attribute 2 may indicate that augmented contents including contents of an advertisement is applied on a limited basis, with respect to the entire section of a corresponding broadcast program.

Attribute 2 may be incorporated into metadata for an augmented broadcasting service with respect to augmented areas of a program, before transmission, indicating that the augmented contents including the contents of the advertisement may be inapplicable, with respect to a predetermined augmented area in the corresponding program.

Attribute 3 may correspond to unique codes assigned to objects for which augmented areas are designated, among guests, a variety of props, and setting elements, appearing in a broadcast program.

In relation to Attribute 3, all objects for which augmented areas are designated may be assigned unique object codes respectively, in advance.

In relation to Attribute 3, broadcasting service information transferred from a broadcasting company to a terminal may include object codes of objects for which augmented areas are designated, among object elements, for example, guests, props, and the like, appearing in a broadcast program. The terminal may utilize such information to search for and select augmented contents.

In relation to Attribute 3, an object code may identify an object having a sense of uniqueness, for example, a character, and an object without a sense of uniqueness. In a case of the object having a sense of uniqueness, an identical object code may be reflected with respect to all broadcast programs. In a case of an industrial product, a predetermined model may be indicated using a single object code.

Attribute 4 may correspond to a unique code for a broadcast content provider. In general, the broadcast content provider may correspond to a broadcasting company or a channel provider. In this instance, an audience may utilize Attribute 4 for readily conducting a search for augmented contents applicable to all programs of a predetermined broadcasting company or channel provider.

Attribute 5 may correspond to a unique code for broadcast contents. An audience may utilize Attribute 5 for readily searching for augmented contents applicable to a predetermined broadcast program.

A broadcast server 104 may refer to a system that may multiplex metadata for an augmented broadcasting service and broadcast contents digitalized for a broadcast, and may transmit the metadata and the broadcast contents to an augmented broadcast receiving terminal 105, in a wireless or wired manner.

The augmented content server 107 may correspond to a server to be used as a medium for transferring produced augmented contents to an audience. The augmented content server 107 may provide the audience with a list of applicable augmented contents with respect to a predetermined broadcast program, by managing a list of registered augmented contents and classifying the augmented contents based on augmented attributes, and may provide augmented contents selected by the audience.

The augmented broadcast receiving terminal 105 may refer to a terminal having an augmented broadcasting service receiving function and processing function. The functions will be described in detail hereinafter.

The augmented broadcast receiving terminal 105 may extract augmented attribute information of broadcast programs from broadcasting service information corresponding to a broadcast program guide, and may store, manage, and interpret the extracted augmented attribute information. Here, the broadcasting service information may include, for example, electronic program guide (EPG), service information (SI), program specific information (PSI), and the like.

The augmented broadcast receiving terminal 105 may extract metadata for an augmented broadcasting service included in a broadcast signal, and may store, manage, and interpret the extracted metadata for the augmented broadcasting service.

The augmented broadcast receiving terminal 105 may compose, store, and manage an augmented content information table by accessing the augmented content server 107 to receive a list of augmented contents and augmented attribute information for respective augmented contents, and integrating the list of the augmented contents and the augmented attribute information for respective augmented contents, with augmented contents stored in an internal storage apparatus or a storage apparatus being accessed.

The augmented broadcast receiving terminal 105 may compose a list of augmented contents applicable to a corresponding program, by comparing augmented attribute information of a desired broadcast program to the augmented content information table.

The augmented broadcast receiving terminal 105 may enable an audience to search for augmented contents through a search interface, and may provide a means for selecting a portion or an entirety of the found augmented contents.

The augmented broadcast receiving terminal 105 may provide a list of all applicable augmented contents with respect to all broadcast programs of a predetermined broadcast content provider or a broadcast channel, and may enable an audience to select a portion or an entirety of augmented contents, in the list of the augmented contents.

The augmented broadcast receiving terminal 105 may provide a list of all augmented contents provided by a predetermined augmented content provider, with respect to a single broadcast program, and may enable an audience to select a portion or an entirety of the augmented contents provided in the list.

The augmented broadcast receiving terminal 105 may provide a list of all applicable augmented contents with respect to a single broadcast program, and may enable an audience to select a portion or an entirety of the augmented contents.

The augmented broadcast receiving terminal 105 may provide a list of augmented contents with respect to a predetermined object, for example, a character, an object, a place, or the like, appearing in a broadcast program, and may enable an audience to select a portion or an entirety of the augmented contents provided in the list.

The augmented broadcast receiving terminal 105 may download or stream, from the augmented content server 107, augmented contents selected by an audience in a list of augmented contents provided for the audience to conduct a search for augmented content through the search interface.

The augmented broadcast receiving terminal 105 may display downloaded augmented contents, among the augmented contents selected by the audience, on a screen at a broadcast time of a corresponding broadcast program, by integrating the downloaded augmented contents with a broadcast image based on the extracted metadata for the augmented broadcasting service.

The augmented broadcast receiving terminal 105 may display streamable augmented contents, among the augmented contents selected by the audience, on a screen at a broadcast time of a corresponding broadcast program, by integrating the streamable augmented contents with a broadcast image based on extracted metadata for the augmented broadcasting service.

The augmented broadcast receiving terminal 105 may display an image or a video stored in a storage apparatus connected to an internal or external portion of the terminal, on a screen at a broadcast time of a broadcast program, by integrating the image or the video with a broadcast image based on extracted metadata for the augmented broadcasting service.

The augmented broadcast receiving terminal 105 may access the augmented content server 107 at predetermined time intervals to verify a current registration state of augmented contents, and may automatically reflect the verified current registration state in the augmented content information table managed by the terminal. Here, the current registration state may include addition, deletion, and change.

The augmented broadcast receiving terminal 105 may automatically update corresponding augmented contents or may enable the audience to determine whether the update is to be performed when the augmented contents stored in the terminal are included in a change in the augmented contents verified from the augmented content server 107.

A means for communication between the augmented broadcast receiving terminal 105 and the augmented content server 107 is not limited to the Internet as shown in FIG. 1. Any type of communication medium means satisfying a quality of the augmented broadcasting service desired according to an embodiment of the present invention may be used.

Figure 2:
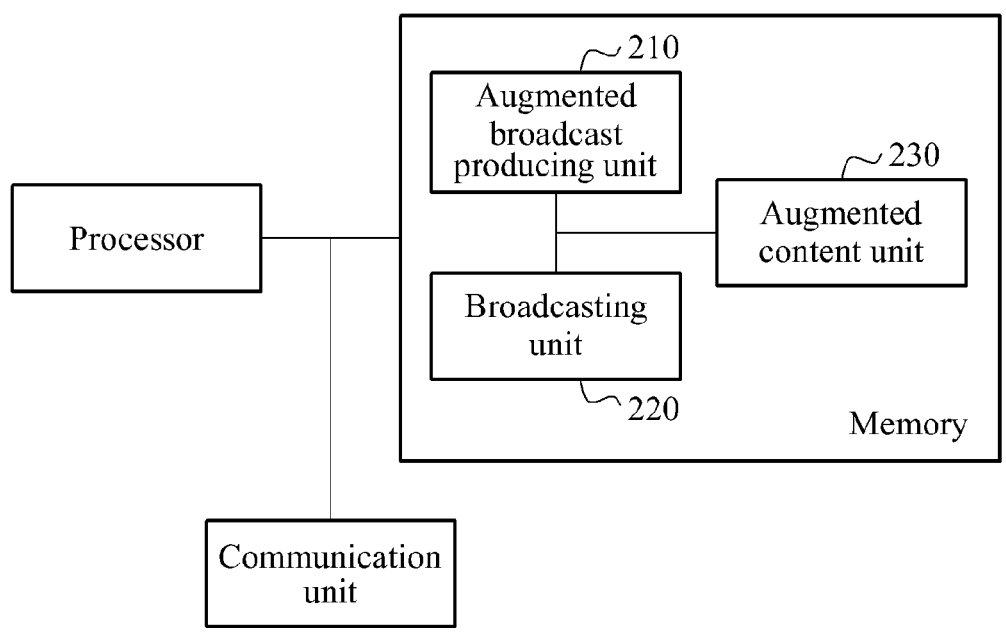
FIG. 2 is a block diagram illustrating a configuration of an augmented broadcasting service providing server according to an embodiment of the present invention.

FIG. 2 is a block diagram illustrating a configuration of an augmented broadcasting service providing server according to an embodiment of the present invention.

Referring to FIG. 2, the augmented broadcasting service providing server may include an augmented broadcast producing unit 210, a broadcasting unit 220, and an augmented content unit 230.

The augmented broadcast producing unit 210 may process a production process of augmented contents to provide an augmented broadcasting service, for broadcast contents. The augmented broadcast producing unit 210 may produce augmented contents related to the broadcast contents, and may transmit the produced augmented contents to the broadcasting unit 220.

The broadcasting unit 220 may multiplex the broadcast contents and metadata for the augmented broadcasting service, and transmit the multiplexed broadcast contents and metadata for the augmented broadcasting service to an augmented broadcast receiving terminal (not shown).

The augmented content unit 230 may provide the augmented broadcast receiving terminal with the augmented contents produced with respect to the broadcast contents. The augmented content unit 230 may provide augmented contents requested by the augmented broadcast receiving terminal FIG. 3 is a block diagram illustrating a configuration of an augmented broadcast receiving terminal according to an embodiment of the present invention.

Figure 3:
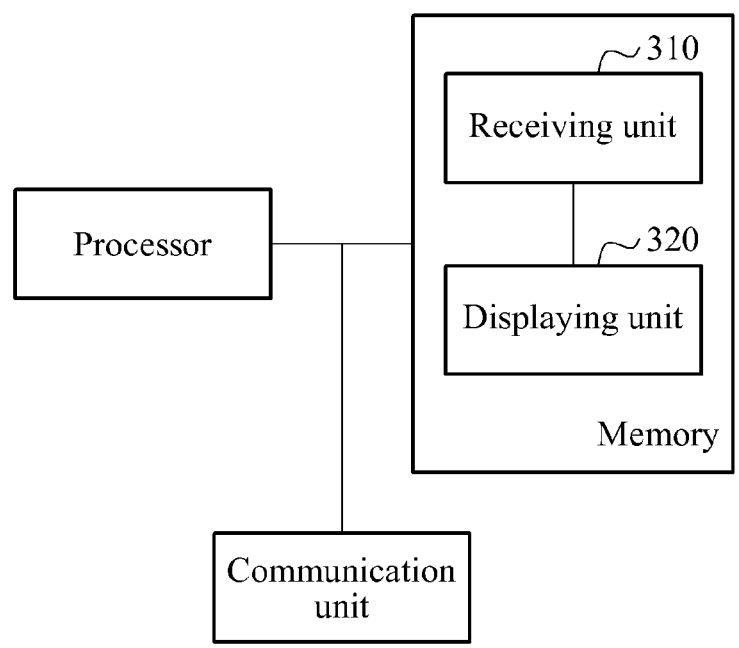
FIG. 3 is a block diagram illustrating a configuration of an augmented broadcast receiving terminal according to an embodiment of the present invention.

Referring to FIG. 3, the augmented broadcast receiving terminal may include a receiving unit 310, and a displaying unit 320.

The receiving unit 310 may receive, through a communication unit from a server, broadcast contents, augmented contents related to the broadcast contents, and metadata for an augmented broadcasting service that serve as parameters for the broadcast contests and the augmented contents mediates between the broadcast contents and the augmented contents.

The receiving unit 310 may extract augmented attribute information of the broadcast contents from broadcasting service information received from the server, and may manage the extracted augmented attribute information with respect to the broadcast contents, in a database (not shown).

The receiving unit 310 may extract metadata for the augmented broadcasting service included in a broadcast signal, and may manage the extracted metadata for the augmented broadcasting service with respect to the broadcast contents, in the database.

The receiving unit 310 may manage an augmented content information table, by accessing an augmented content server to receive a list of augmented contents and augmented attribute information for respective augmented contents, and integrating the list of the augmented contents and the augmented attribute information for respective augmented contents, with augmented contents stored in a storage apparatus.

The receiving unit 310 may access the augmented content server at predetermined time intervals to verify a current registration state of augmented contents, and may reflect the verified current registration state in the augmented content information table.

The receiving unit 310 may compose a list of augmented contents to be applied to corresponding broadcast contents, by comparing augmented attribute information of broadcast contents to be viewed to the augmented content information table.

The receiving unit 310 may search for augmented contents in the list of the augmented contents to be applied to the broadcast contents, in response to an input of an audience, and select and provide a portion or an entirety of the found augmented contents.

The receiving unit 310 may download or stream augmented contents selected by the audience, from the augmented content server, and store the downloaded or streamed augmented contents in the storage apparatus.

The receiving unit 310 may update corresponding augmented contents or may receive, from the audience, a selection regarding whether the update is to be performed when the augmented contents stored in the storage apparatus are included in a change in the augmented contents verified from the augmented content server.

The displaying unit 320 may integrate and process the broadcast contents and the augmented contents, based on the metadata. The displaying unit 320 may process the augmented contents based on the metadata for the augmented broadcasting service, while playing the broadcast contents.

The displaying unit 320 may display downloaded augmented contents, by integrating the downloaded augmented contents with the broadcast contents. The displaying unit 320 may display the downloaded augmented contents, among augmented contents selected by the audience, on a screen at a broadcast time of corresponding broadcast contents, by integrating the downloaded augmented contents with the broadcast contents based on extracted metadata for the augmented broadcasting service.

The displaying unit 320 may display streamed augmented contents, by integrating the streamed augmented contents with the broadcast contents. The displaying unit 320 may display streamable augmented contents, among augmented contents selected by the audience, on a screen at a broadcast time of corresponding broadcast contents, by integrating the streamable augmented contents with the broadcast contents based on extracted metadata for the augmented broadcasting service.

The displaying unit 320 may display an image or a video stored in the storage apparatus, by integrating the image or the video with the broadcast contents. The displaying unit 320 may display the image or the video stored in the storage apparatus on a screen at a broadcast time of broadcast contents, by integrating the image or the video with the broadcast contents based on extracted metadata for the augmented broadcasting service.

Figure 4:
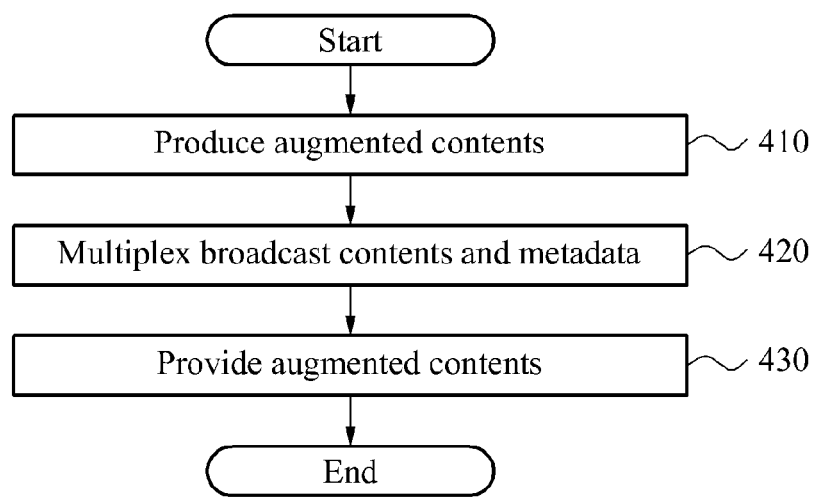
FIG. 4 is a flowchart illustrating an augmented broadcasting service providing method of a server according to an embodiment of the present invention.

FIG. 4 is a flowchart illustrating an augmented broadcasting service providing method of a server according to an embodiment of the present invention.

An operation of the server providing an augmented broadcasting service will be described with reference to FIG. 4.

Referring to FIG. 4, in operation 410, the server may process a production process of augmented contents to provide the augmented broadcasting service, for broadcast contents. The server may produce augmented contents related to the broadcast contents, and may transmit the produced augmented contents to a broadcasting unit.

In operation 420, the server may multiplex metadata to be used for providing an augmented broadcasting service corresponding to the broadcast contents, and transmit the multiplexed metadata to an augmented broadcast receiving terminal.

In operation 430, the server may provide the augmented broadcast receiving terminal with the augmented contents produced with respect to the broadcast contents. The server may provide augmented contents requested from the augmented broadcast receiving terminal, for the broadcast contents.

FIG. 5 is a flowchart illustrating an augmented broadcasting service receiving method of a receiving terminal according to an embodiment of the present invention.

An operation of the receiving terminal providing an augmented broadcast will be described with reference to FIG. 5.

Referring to FIG. 5, in operation 501, the receiving terminal may receive, from an augmented broadcasting service providing server, broadcast contents, augmented contents related to the broadcast contents, and metadata for an augmented broadcasting service that may serve as parameters for the broadcast contents can the augmented contents mediates between the broadcast contents and the augmented contents.

In operation 502, the receiving terminal may extract augmented attribute information of the broadcast contents from broadcasting service information received from a server, and manage the extracted augmented attribute information with respect to the broadcast contents, in a database.

In operation 503, the receiving terminal may extract metadata for the augmented broadcasting service included in a broadcast signal, and manage the extracted metadata for the augmented broadcasting service with respect to the broadcast contents, in the database.

In operation 504, the receiving terminal may manage an augmented content information table, by accessing the augmented content server to receive a list of augmented contents and augmented attribute information for respective augmented contents, and integrating the list of the augmented contents and the augmented attribute information for respective augmented contents, with augmented contents stored in a storage apparatus.

In operation 505, the receiving terminal may access the augmented content server at predetermined time intervals to verify a current registration state of augmented contents, and update the augmented content information table with the verified current registration state.

In operation 506, the receiving terminal may compose a list of augmented contents to be applied to corresponding broadcast contents, by comparing augmented attribute information of broadcast contents to be viewed to the augmented content information table.

In operation 507, the receiving terminal may search for augmented contents in the list of the augmented contents to be applied to the broadcast contents, in response to an input of an audience, and select and provide a portion or an entirety of the found augmented contents.

In operation 508, the receiving terminal may download or stream augmented contents selected by the audience, from the augmented content server, and store the downloaded or streamed augmented contents in the storage apparatus.

In operation 509, the receiving terminal may update corresponding augmented contents or may receive a selection regarding whether the update is to be performed from the audience when the augmented contents stored in the storage apparatus are included in a change in the augmented contents verified from the augmented content server.

In operation 510, the receiving terminal may process the augmented contents, based on the metadata for the augmented broadcasting service, while playing the broadcast contents. The receiving terminal may integrate the broadcast contents with the augmented contents, based on the metadata for the augmented broadcasting service, and may display the integrated contents on a screen.

In operation 511, the receiving terminal may display downloaded augmented contents on the screen, by integrating the downloaded augmented contents with the broadcast contents. The receiving terminal may display the downloaded augmented contents, among augmented contents selected by the audience, on the screen at a broadcast time of corresponding broadcast contents, by integrating the downloaded augmented contents with the broadcast contents based on extracted metadata for the augmented broadcasting service.

In operation 512, the receiving terminal may display streamed augmented contents on the screen, by integrating the streamed augmented contents with the broadcast contents. The receiving terminal may display streamable augmented contents, among augmented contents selected by the audience, on the screen at a broadcast time of corresponding broadcast contents, by integrating the streamable augmented contents with the broadcast contents based on extracted metadata for the augmented broadcasting service.

In operation 513, the receiving terminal may display an image or a video stored in the storage apparatus, by integrating the image or the video with the broadcast contents. The receiving terminal may display the image or the video stored in the storage apparatus on the screen at a broadcast time of broadcast contents, by integrating the image or the video with the broadcast contents based on extracted metadata for the augmented broadcasting service.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

According to an embodiment of the present invention, a scene in which augmented contents corresponding to preference of an audience is integrated may be displayed, contrary to a conventional broadcast by which all audiences viewing an identical broadcast program may view an identical scene.

According to an embodiment of the present invention, contrary to a conventional service structure in which only a broadcasting company provides contents on a TV screen of each home, various agents may provide augmented contents in various forms, whereby a viewing pleasure may be increased and a number of types of business may be created.

According to an embodiment of the present invention, by using a broadcast program as a medium, a foundation for various agents to access a TV screen of an audience may be provided.

According to an embodiment of the present invention, an audience selection type augmented broadcasting service providing apparatus and method may be applied to broadcasting industries, for example, terrestrial broadcasting, cable broadcasting, satellite broadcasting, digital multimedia broadcasting (DMB), Internet protocol television (IPTV) broadcasting, and the like, and video services, for example, a video-on-demand (VOD) service, a user created contents (UCC) service, and the like, and Internet broadcasting. The apparatus and method may be utilized for a promotion of contents to be provided, an increase in viewer ratings, and the like, by a broadcasting service provider and a broadcast content producer.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An augmented broadcast receiving terminal, comprising:
 a receiving unit configured to receive broadcast contents, augmented contents, and metadata for an augmented broadcasting service from a server; and
 a displaying unit configured to process the augmented contents based on the metadata for the augmented broadcasting service while playing the broadcast contents,
 wherein the receiving unit updates corresponding augmented contents or receives a selection regarding whether the update is to be performed from an audience when the augmented contents stored in a storage apparatus are included in a change in the augmented contents verified from an augmented content server.

2. The terminal of claim 1, wherein the receiving unit is configured to extract augmented attribute information of broadcast contents from broadcasting service information, and to manage the augmented attribute information extracted.

3. The terminal of claim 1, wherein the receiving unit is configured to extract metadata for the augmented broadcasting service included in a broadcast signal, and to manage the extracted metadata for the augmented broadcasting service.

4. The terminal of claim 1, wherein the receiving unit is configured to manage an augmented content information table, by accessing the augmented content server to receive a list of augmented contents and augmented attribute information for respective augmented contents, and integrating the list of augmented contents and the augmented attribute information for respective augmented contents, with augmented contents stored in the storage apparatus.

5. The terminal of claim 1, wherein the receiving unit is configured to access the augmented content server at predetermined time intervals to verify a current registration state of augmented contents, and to reflect the verified current registration state in an augmented content information table.

6. The terminal of claim 1, wherein the receiving unit is configured to compose a list of augmented contents to be applied to corresponding broadcast contents, by comparing augmented attribute information of broadcast contents to be viewed to an augmented content information table.

7. The terminal of claim 1, wherein the receiving unit is configured to search for the augmented contents in response to an input of the audience, and selects and to provide a portion or an entirety of the found augmented contents.

8. The terminal of claim 1, wherein the receiving unit is configured to download or steam augmented contents selected by the audience, from the augmented content server.

9. The terminal of claim 1, wherein the displaying unit is configured to display an image or a video stored in the storage apparatus on a screen at a broadcast time of broadcast contents, by integrating the image or the video with the broadcast contents based on extracted metadata for the augmented broadcasting service.

10. An augmented broadcasting service receiving method of a receiving terminal, the method comprising:
receiving broadcast contents, augmented contents, and metadata for an augmented broadcasting service from a server;
processing the augmented contents based on the metadata for the augmented broadcasting service while playing the broadcast contents; and
updating corresponding augmented contents or receiving a selection regarding whether the update is to be performed from an audience when the augmented contents stored in a storage apparatus are included in a change in the augmented contents verified from an augmented content server.

11. The method of claim 10, wherein the receiving comprises extracting augmented attribute information of broadcast contents from broadcasting service information, and managing the augmented attribute information extracted.

12. The method of claim 10, wherein the receiving comprises extracting metadata for the augmented broadcasting service included in a broadcast signal, and managing the extracted metadata for the augmented broadcasting service.

13. The method of claim 10, wherein the receiving comprises managing an augmented content information table, by accessing an augmented content server to receive a list of augmented contents and augmented attribute information for respective augmented contents, and integrating the list of the augmented contents and the augmented attribute information for respective augmented contents with augmented contents stored in the storage apparatus.

14. An augmented broadcast receiving terminal, comprising:
a receiving unit configured to receive broadcast contents, augmented contents, and metadata for an augmented broadcasting service from a server; and
a displaying unit configured to process the augmented contents based on the metadata for the augmented broadcasting service while playing the broadcast contents,
wherein the displaying unit is configured to display one or more of downloaded augmented contents and streamable augmented contents, among augmented contents selected by an audience, on a screen at a broadcast time of corresponding broadcast contents, by integrating the one or more of the downloaded augmented contents and the streamable augmented contents with the broadcast contents based on extracted metadata for the augmented broadcasting service.

15. An augmented broadcasting service receiving method of a receiving terminal, the method comprising:
receiving broadcast contents, augmented contents, and metadata for an augmented broadcasting service from a server;
processing the augmented contents based on the metadata for the augmented broadcasting service while playing the broadcast contents; and
displaying one or more of downloaded augmented contents and streamable augmented contents, among augmented contents selected by an audience, on a screen at a broadcast time of corresponding broadcast contents, by integrating the one or more downloaded augmented contents and streamable augmented contents with the broadcast contents based on extracted metadata for the augmented broadcasting service.

* * * * *